United States Patent

[11] 3,582,945

[72] Inventor William J. Bowers
Claremont, Calif.

[21] Appl. No. 724,978
[22] Filed Apr. 29, 1968
[45] Patented June 1, 1971
[73] Assignee MSI Data Corporation
Montclair, Calif.

[54] INPUT DEVICE
12 Claims, 10 Drawing Figs.

[52] U.S. Cl. .......... 340/365, 178/17C
[51] Int. Cl. .......... G08c 9/04
[50] Field of Search .......... 340/365; 178/17, 17 A, 17 D: 235/61 IPOP-2.13, 153

[56] References Cited

UNITED STATES PATENTS

| | | | |
|---|---|---|---|
| 2,408,754 | 10/1946 | Bush | 235/61 IPOP-2.13 |
| 3,104,388 | 9/1963 | Balenger | 340/365 |
| 3,414,670 | 12/1968 | Place | 340/365 |
| 3,105,636 | 10/1963 | Greene | 235/61 IPOP-2.13 |
| 3,456,077 | 7/1969 | Jones | 178/17 |
| 3,472,449 | 10/1969 | Marino | 235/61 IPOP-2.13 |
| 3,217,313 | 11/1965 | Naxon | 340/365 |
| 3,430,226 | 2/1969 | Chow | 340/365 |
| 3,466,647 | 9/1969 | Guzak | 340/365 |

*Primary Examiner*—Thomas B. Habecker
*Attorney*—Christie, Parker & Hale

ABSTRACT: An input device for generating electrical data signals and an associated electrical timing signal and which input device is a modified conventional calculating machine. The machine may be an adding machine having a plurality of manually operated data keys for mechanically entering data into the machine in a conventional fashion and a machine element movably responsive to the release of an actuated key. Each data key is associated with a magnetically operable reed switch that is arranged to be operated by a permanent magnet mounted to be movable with the operation of a data key to provide the electrical data signal. The machine element may be an indexable machine carriage carrying an apertured index indicator for photoelectrically generating the timing signal associated with the electrical data signal. The photoelectric system has a light source mounted on one side of the carriage index indicator and a normally dark light sensor mounted on the opposite side of the index indicator. The release of an operated key will index the machine carriage one position and cause the illumination of the light sensor during the indexing operation to thereby generate the electrical timing signal.

INVENTOR.
WILLIAM J. BOWERS
BY
Christie, Parker & Hale
ATTORNEYS

INVENTOR.
WILLIAM J. BOWERS
BY
Christie, Parker & Hale
ATTORNEYS

INVENTOR.
WILLIAM U. BOWERS
BY
Christie, Parker & Hale
ATTORNEYS

INVENTOR.
WILLIAM J. BOWERS
BY
Christie, Parker & Hale
ATTORNEYS

INPUT DEVICE

This invention relates to an input device and more particularly to an input device for generating electrical signals for entry into an electronic system.

Input devices are generally known in the art for providing a means for entering electrical signals into digital computing systems and digital handling systems. Generally, these devices are adapted to the particular type of information to be entered into the system and the type of system associated with the device. For example, in the more complex computing systems the input device may comprise punched card systems and paper tape systems and their associated reading systems while yet others employ magnetic storage. In the simpler systems the input devices are manually operated through keys for recording the information and which information may be converted to other forms for entering information. In general, these systems provide the necessary signals for entering into the associated systems but do not provide some permanent, readable record of the information entered into the system. To provide such an associated record, generally means that the overall cost of the input device is substantially increased. There is a need at the present time for a very inexpensive input device that generates the necessary signals to be introduced into a system and also produces a permanent record of the information or data entered into the system for checking purposes.

The present invention provides an improved and relatively inexpensive input device through the employment of a standard commercially available adding or calculating machine that may be simply modified for the purposes of providing the desired electrical signals for use in an electronic system. The conventional adding machine is preferably a machine of the type having the printout means so that the electrical signals generated through operation of the machine will also be printed out in the usual fashion as the information is entered into the machine through the operation of the keys. Since the modifications to the commercially available machine are relatively simple and the machine selected for this purpose has been satisfactorily employed on a commercial basis for a number of years, the resulting input device is not only relatively inexpensive but may be operated relatively error and trouble free for long periods of time. In addition the input device is modified in a fashion to provide a visible indication that an error has been introduced into the system either by the machine operator or due to faulty electronic elements in the associated system. Furthermore, the machine incorporates lockout means for preventing further entry of information into the system once an error has been detected and signalled.

From a structural standpoint the input device comprises a 10 key calculating machine for printing out the information entered into it through the operation of the keys. Each of the data keys of the machine is adapted for entering a different piece of data in the machine and each is adapted for producing an electrical signal representative of the operated key for entry of the resulting signal into the associated system. Each of the data keys in accordance with the present invention mounts a permanent magnet to be movable with the key. A plurality of magnetically operable switches, one for each data key, are mounted on the machine adjacent the data keys to be magnetically responsive to the movement of the data keys for effecting the switch operation and thereby generating the data output signal corresponding to the operated data key. The machine includes a conventional carriage index indicator, in this instance, having a plurality of spaced apart apertures thereon and movable in the usual fashion upon the operation of a data key. Associated with the index indicator is a light source on one side thereof and a light sensor on the opposite side for signalling carriage movement. Upon carriage movement, the light sensor is illuminated through the apertures of the indicator for generating a timing signal corresponding to the electrical data signal generated in response to the key operation. This timing signal is generated for each of the conventional data keys, such as the decimal digit keys. In addition the input device employs the remaining keys of the machine for generating and entering the data and the data signals are generated in the same general fashion as for the numerical keys. The timing signals for the other keys of the machine function keys are generated through the provision of the electromechanical switch means mounted on the machine to be responsive to a machine element operation during a machine cycle function.

These and other features of the present invention may be more fully appreciated when considered in the light of the following specification and drawings, in which.

Figure 1:
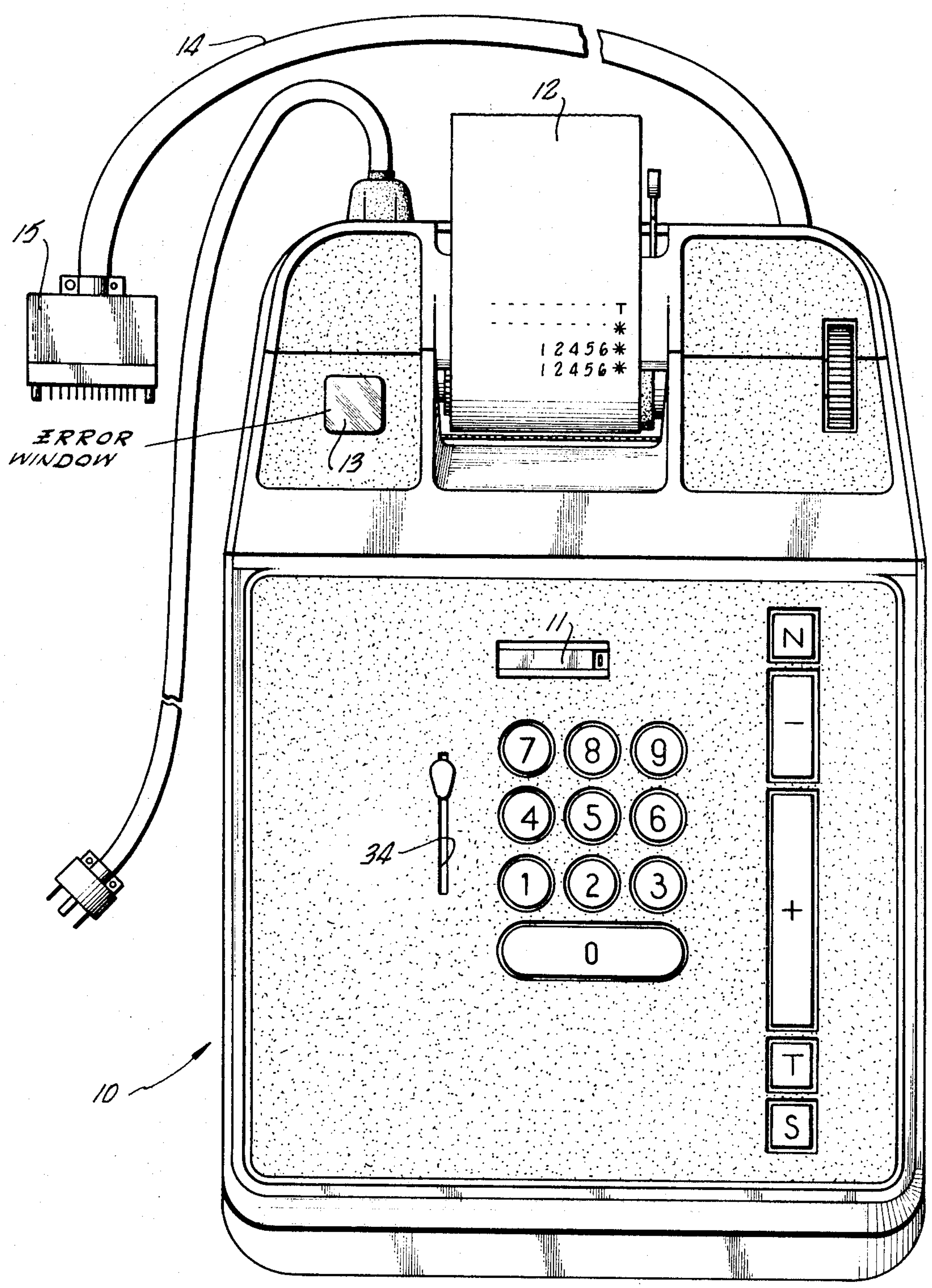
FIG. 1 is a top plan view of a conventional calculating machine embodying the present invention.

Now referring to the drawings, a description of the operation of the input device as the invention is embodied in a conventional, commercially available calculating machine will be examined in detail. The input device of the present invention is a modification of a 10-key adding machine manufactured commercially by the Victor Comptometer Corporation, Business Machines Division, 3900 N. Rockwell St., Chicago, Ill. In particular, the Victor adding machine employed is the eight-column, electrically operated credit balance Victor Imperial model having Model No. 17–58–54. The normal operation of such an adding machine is not altered for the purposes of the present invention and the modifications required for converting the machine to an input device does not interfere with the normal operation. Accordingly, only those parts of the machine required for the understanding of the modifications of the machine for the purposes of the present invention will be described. For a more detailed description of the various parts of the adding machine per se reference may be had to the service manual for the aforementioned Victor adding machine publicly available through Victor Comptometer Corporation.

The input device 10 as mentioned hereinabove is a 10-key adding machine wherein the 10 numerical keys are normally identified with the decimal digits 0—9 thereon. These numerical keys are shown in the central portion of the key bank as the operator faces the machine in operating same. In addition, there are five keys that are normally considered as the machine function keys. These keys are shown to the right of the numerical keys and are identified reading from the top to the bottom as the "N" key, the – (minus) key, the entry key, the T (total) key and the S (subtotal) key. All of the keys are appropriately marked with the exception of the entry key which is also considered the motor bar or the + (plus) key and sets the machine into operation upon the depression thereof. The remaining key is the unmarked key arranged to the left of the numerical keys and is considered the "C" key or the clear key. Upon operation of this "C" key, any erroneous information entered into the machine may be cleared so that the machine can be operated anew. The 17th key, the "R" key, normally provided for the aforementioned Victor model is not employed for the purposes of the input device 10.

As will be more evident hereinafter, the usual viewing window illustrated as the window 11 in FIG. 1 is blocked out and is not employed for the purposes of this invention. The selected model of the adding machine also provides a printout for all of the entries made into the machine and the paper tape 12 upon which the entries are recorded is shown in its typical position showing the information that has been entered into the machine recorded thereon. The * (asterisk) recorded on the paper tape 12 results from the operation of the motor bar key. In addition, there is shown to the left of the paper tape 12 an error window 13 which has been added to the conventional machine for the purposes of visually signalling the operator that an error has been detected and some correction is required. For the purposes of entry of the information from the input device into the associated system, the signals generated by means of the machine 10 are cabled and connected to a connector for ready connection to the associated electronic equipment. The cable is shown as a cable 14 mounting the connector 15 on one end thereof.

Figure 2:
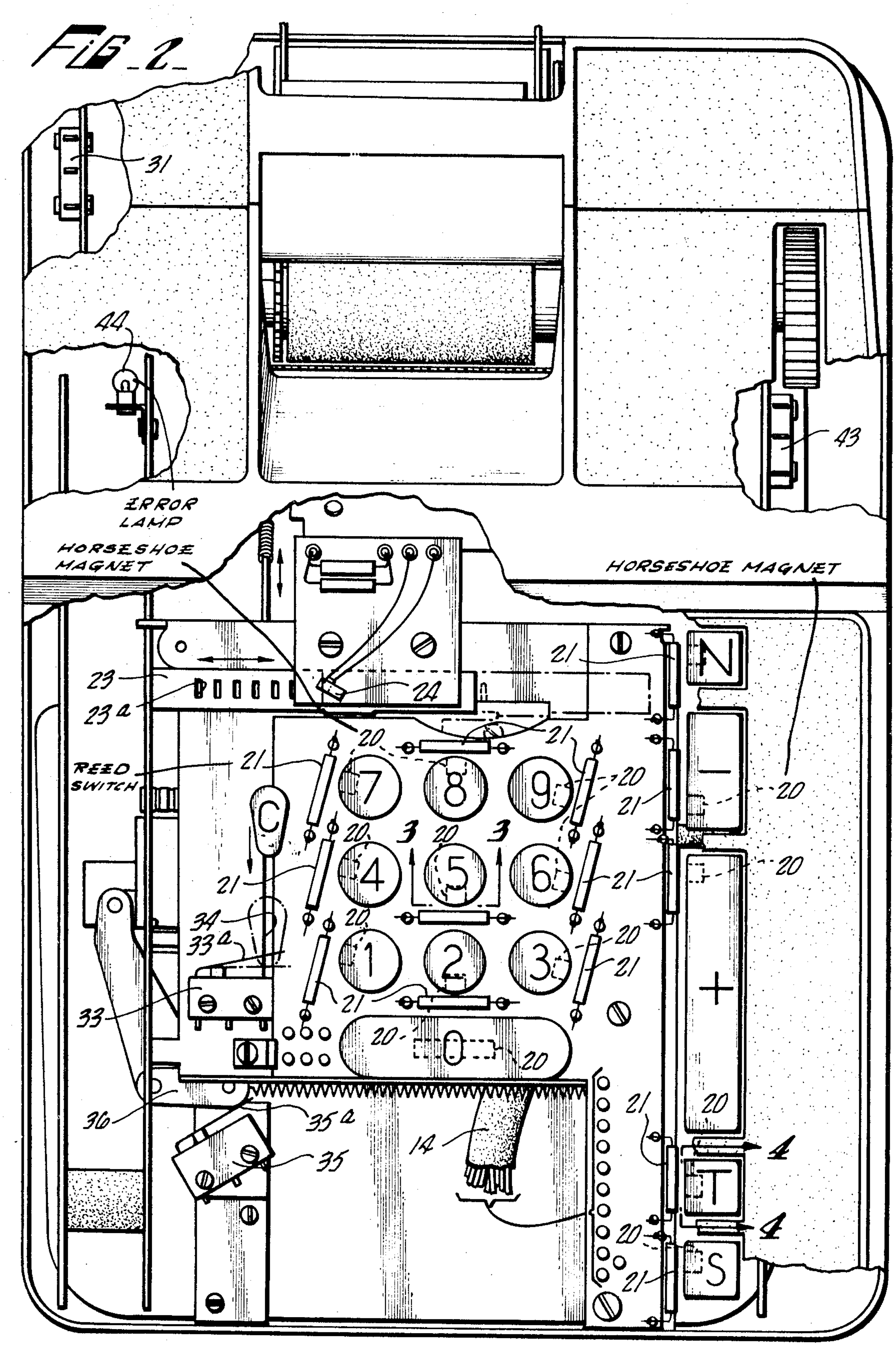
FIG. 2 is a top plan view of the machine of FIG. 1, with the cover removed, and portions of the machine broken away.

The electrical signals generated by the input device 10 are generated substantially simultaneously with the operation of each of the aforementioned numerical keys and the machine function keys including the clear key. For the purposes of generating the desired electrical signals for use in associated electrical systems each of the keys with the exception of the "C" key is provided with a flux-generating element in the form of a horseshoe magnet 20. The magnet 20 is mounted into an opening drilled into one side of the key proper by cementing it or the like into the opening so as to be carried by the key and movable therewith. The magnets 20 are mounted at the side of the keys except the "0" key. The magnet 20 for the "0" key is cemented to the top inside surface of the key as indicated in FIG. 2. Associated with each of the aforementioned keys is a hermetically sealed proximity-type reed switch identified by the reference numeral 21. The reed switches 21 are mounted in a spaced relationship with its associated key, the switch being mounted immediately adjacent the key. The relationship of the magnet 20 and its associated reed switch 21 is such that when the key is in its normal position the magnetic flux emanating from the magnet 20 does not effect the normal open circuit condition of the reed switch 21. However, with the depression of the associated key, the magnet 20 moves towards the reed switch 21 and the flux extending outwardly therefrom causes the switch 21 to respond to this magnetic field and cause it to close its contacts for signalling the operation of the associated key. With the key assuming its normal position, once again, the reed switch 21 is no longer in the path of the magnetic flux emanating from the horseshoe magnet and will assume its normal open circuit condition. The reed switches 21 are mounted on a printed circuit card and each appropriately connected with lead wires and arranged into the cable 14 and connected to the correct pins of the connector 15.

In addition to the electrical signals generated by the input device 10 for entering data into the associated system there is also generated substantially simultaneously with the operation of the data keys a timing signal. The timing signals are generated in a different fashion in accordance with whether the numerical keys 0—9 are operated or the machine function keys are operated. The structure for generating the timing signals for the numerical keys 0—9 will first be examined.

Figure 5:
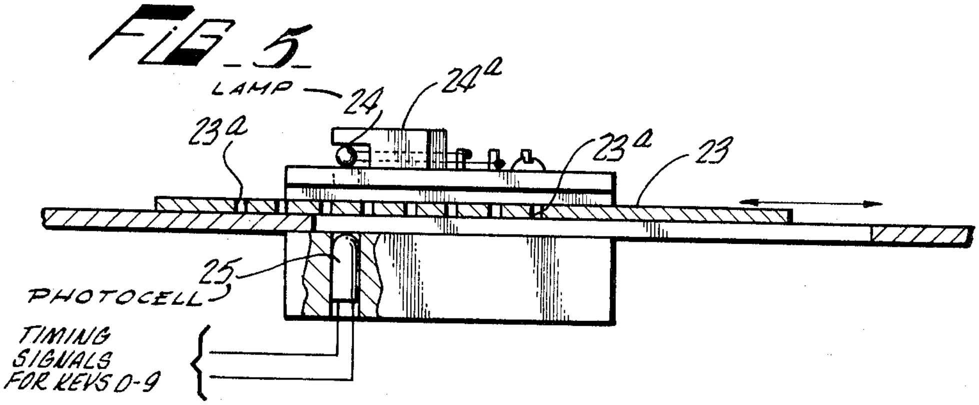
FIG. 5 is a partial elevational view with parts in section of the optical system for generating the timing signals for the numerical keys.
Figure 3:
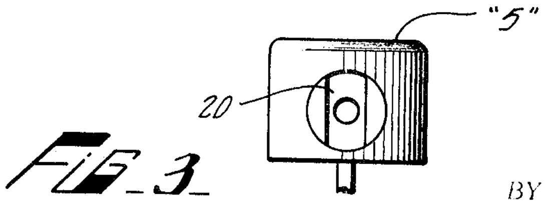
FIG. 3 is an elevational view taken along the lines 3–3 of FIG. 2 of a numerical key.
Figure 7:
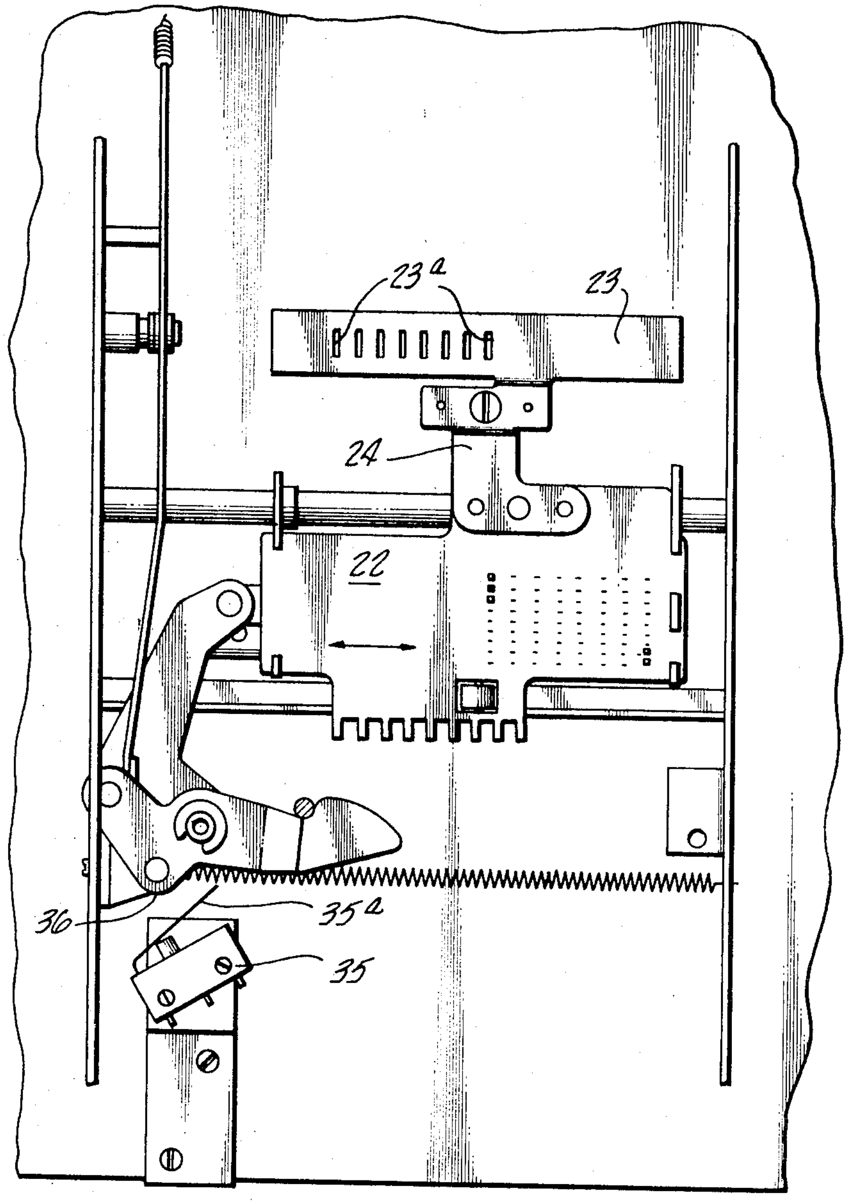
FIG. 7 is a top, plan view of the machine as illustrated in FIG. 1 with parts removed to illustrate the carriage motion signalling switch.

In the conventional adding machine there is provided a pin carriage which is movable in response to the operation of each of the numerical keys 0—9. Stated differently, the pin carriage essentially indexes one position to the left after each operated key is released. This pin carriage is best illustrated in FIG. 7 and is identified by the reference numeral 22. The carriage 22 normally mounts a carriage index indicator which provides a visible indication to the machine operator of the digit entered into the machine through the window 11. For the purposes of the present invention, however, the carriage index indicator is modified and as mentioned hereinabove the digits normally indicated on the carriage index indicator are not visible at this window 11. The carriage index indicator for the purposes of the present invention is identified by the reference numeral 23 and is shown secured in the normal fashion to the carriage 22 by means of the bracket 24. The carriage index indicator 23 is provided with a plurality of rectangular spaced apart apertures $23^a$. The apertures $23^a$ are longitudinally arranged on the index indicator 23 in a preselected spaced apart relationship. The index indicator 23 is employed with an optical system for signalling the carriage movement and thereby providing the desired timing signal. The optical system for this purpose comprises a light source shown as the lamp 24 mounted on an apertured panel with the lampholder $24^a$ holding it in a position as illustrated in FIG. 5 over the indicator 23. A photocell 25 is mounted on the opposite side of the indicator 23. The relative arrangement of the indicator 23, light source 24 and photocell 25 is such that the apertures $23^a$ of the indicator 23 are spaced out of alignment of the path of the light rays from the light source 24 to the photocell 25 when the carriage is in a stationary position. Accordingly, the photocell 25 is normally maintained in a dark condition and no signal is derived therefrom. The spacing of the apertures $23^a$ is such that with the indexing or movement of the carriage 22 to the left in response to the release of an operated key the apertures $23^a$ are moved into the path of the light rays from the light source 24 to cause them to impinge on the photocell 25 and to activate the photocell for producing an output signal therefrom. With the completion of the travel of the carriage 22 and thereby the indicator 23 the apertures $23^a$ previously in alignment with the light source 24 and the photocell 25 is moved out of alignment and the photocell 25 returns to its dark condition.

Figures 4, 6, 9:
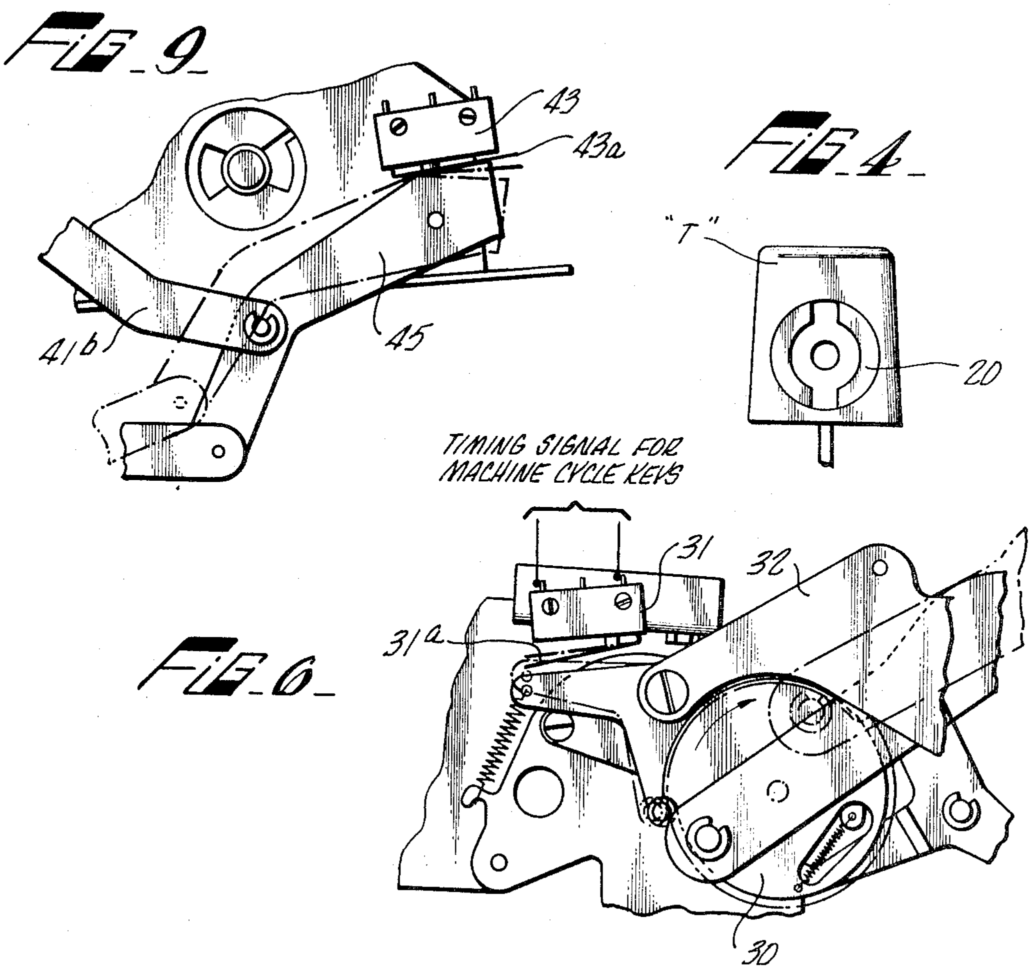
FIG. 4 is an elevational view taken along the lines 4–4 of one of the machine function keys.
FIG. 6 is a partial, elevational view of the machine elements showing the switching arrangement for generating the timing signals for the machine cycle keys.
FIG. 9 is a partial, side elevational view of the machine illustrating the machine cycle switch.

The timing signals for the motor bar keys, namely, the keys identified as the +, −, T, S and N keys are generated through the conventional machine cycle cam employed in the machine 10. The machine cycle cam 30 is best illustrated in FIG. 6. For the purposes of generating the machine cycle timing signal the cam is associated with an electromechanical switch illustrated as the switch 31. The switch 31 is mounted to the top left-hand corner of the machine as illustrated in FIG. 2 and is the usual location of the machine cycle cam 30. Unlike the numerical keys, the machine cycle key conventionally is arranged so that when a machine cycle key is depressed a holding arm engages the keys to hold them down until the entire machine cycle is substantially completed even if the key is released by the operator prior to this time. The machine cycle cam 30 is arranged with a tripping lever 32 (in the conventional machine) so that in response to the operation of a machine cycle key, the cam 30 will rotate in a clockwise direction causing the tripping arm 32 to move in a clockwise direction towards the actuating arm $31^a$ for the switch 31. At an interval towards the end of a complete revolution of the machine cycle cam 30, the tripping arm 32 will engage the arm $31^a$ and operate the switch 31 for causing an electrical signal to be provided therefrom. This operation then will be effected each time one of the machine cycle keys is depressed.

The remaining key to be considered is the clear key. The operation of this key has been modified to include means for generating electrical signals to indicate when the clear key has reached its end of travel as best illustrated in FIGS. 1 and 2. The clear key is movable longitudinally along a slot 34 and is normally positioned at the upper extremity as shown in FIGS. 1 and 2 and is moved to its lower extremity to effect the clearing of the machine. A mechanical switch 33 having an arm $33^a$ is mounted adjacent the lower extremity of the clear key slot 34. The arm $33^a$ for the switch 33 is mounted in the path of the arm mounting the clear key "C" as it approaches its lower extremity, as best illustrated in FIG. 2, so as to engage the arm $33^a$ and cause the arm to move along with it as it reaches the lower extremity of the slot 34. It should be evident that with the operation of the arm $33^a$ the switch 33 provides an electrical output signal thereby signalling that the machine has been cleared.

The machine further includes means for electrically signalling the motion of the carriage 22 reaching its left-hand extremity and for this purpose an electromechanical switch 35 having an operating arm $35^a$ is mounted adjacent the conventional carriage restoring arm 36. The carriage restoring arm 36 is illustrated in its normal position or at a time after the "C" key has been operated in FIG. 7. The carriage-restoring arm 36 is movable with the indexing of the carriage 22 to the left. Accordingly, when the arm 36 pivots to its extremity it engages the arm $35^a$ for the switch 35 and signals this extreme position. At all other times the arm $35^a$ and the arm 36 are in a spaced-apart relationship.

Figure 8:
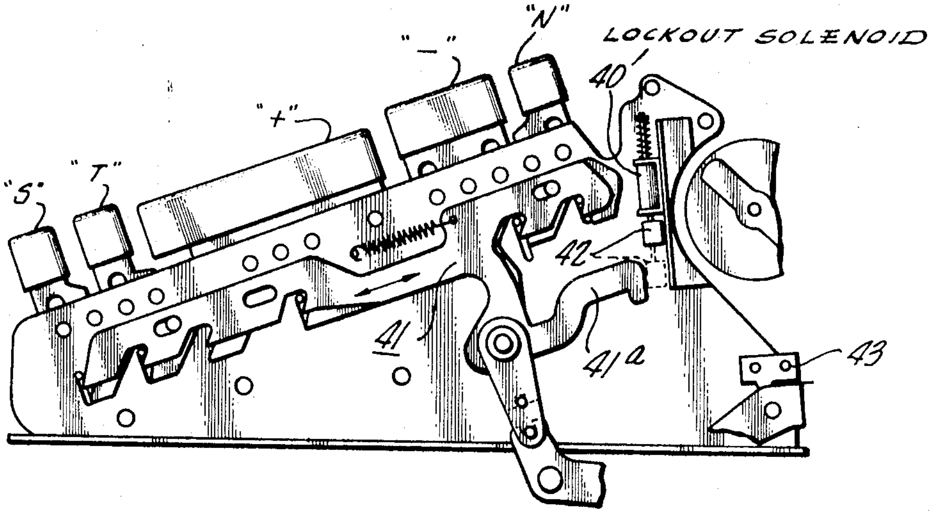
FIG. 8 is a partial, side elevational view of the machine illustrating the lockout means.
Figure 10:
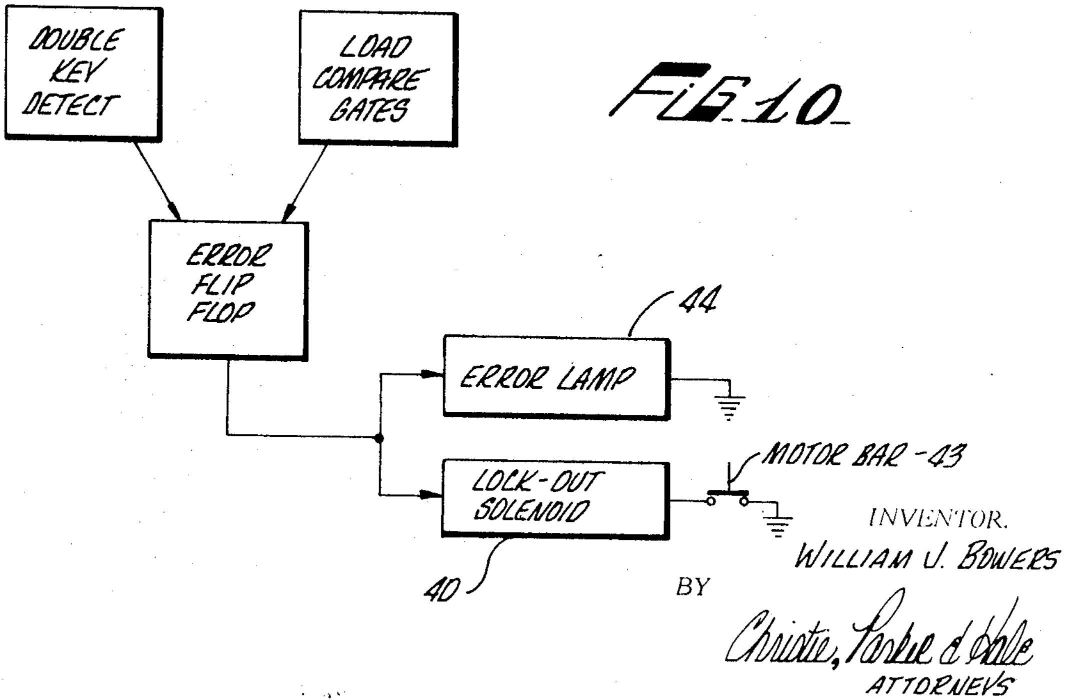
FIG. 10 is a block diagram of the error detection arrangement and the signalling means therefor.

Another important feature of the input device 10 is the arrangement for locking out the machine in the event an error is detected due to the machine operator keying two keys at the same time or an error has been detected in the associated electronic system. The details of the electrical circuitry for detecting errors is only broadly described herein and a more detailed description of this error-detecting circuit may be had by reference to the copending application entitled ELECTRONIC SYSTEM having Ser. No. 724,973 and assigned to the same assignee as the present invention and which disclosure is incorporated herein by reference. The lockout of the machine is such that when an error is detected the machine is locked out at a time when the machine is not going through a machine cycle. For this purpose the conventional motor bar trip slide of the Victor adding machine under consideration is provided with a lockout solenoid 40 mounted adjacent the motor bar trip slide is identified by the reference numeral 41 and is best illustrated in FIG. 8. This trip slide 41 is responsive to the operation of a machine cycle key to move to the right as illustrated in FIG. 8. The lockout solenoid 40 has a stop 42 mounted on the end of its plunger that is movable into the path of the arm $41^a$ of the trip slide 41 to prevent its movement to the right in response to the energization of the solenoid 40. The position of the stop 42 when the solenoid 40 is energized is shown in dotted outline in FIG. 8. In addition, there is arranged in series circuit relationship with the solenoid 41 an electromechanical switch 43. The switch 43 may be considered as the motor bar switch and is arranged to be in a normally closed circuit condition. The function of the motor bar switch 43 is such that with the normal operation of the machine, solenoid 40 is maintained in a deenergized condition. This results from the movement of an intermediate link $41^b$ (see FIG. 9) movable in response to the operation of the slide 41. The link $41^b$ mounts the switch operating arm 45 movable in response to the movement of the arm $41^b$ to allow the switch arm $43^a$ to be released and open the switch 43, as best illustrated in FIG. 9. This assures that in the event an error is detected when the machine is going through a machine cycle that the machine cycle will not be interrupted as a result of the energization of the lockout of the solenoid 40. It will allow the machine cycle to be completed before the solenoid 40 becomes effective. This will, of course, be true since in the normal condition the switch 43 is in a closed circuit condition. Upon the detection of an error, then, and during a static interval of the machine the lockout solenoid 40 will be energized to prevent the motor bar trip slide 41 from going through its excursion. At this same time the error lamp 44 mounted behind the window 13 on the machine proper will be illuminated.

The error lamp 44 is connected in parallel circuit relationship with the lockout solenoid 40 so that upon detection of the error, both the solenoid 40 and the lamp 44 will be energized. Of course, as mentioned hereinabove, if the error is detected at a time that the machine is going through the machine cycle the motor bar switch 43 will prevent the solenoid 40 from becoming energized but the error lamp 44 will be energized and thus provide the signal to the machine operator that there has been an error detected. If the error is the machine operator's error this can be readily corrected by the operation of the clear key. If there is a malfunction in the system this will have to be corrected prior to proceeding with the entry of information into the associated electronic system.

With the above structure in mind, then, the operation of the input device 10 for generating the desired signals can now be summarized. It is assumed that the carriage 22 is placed in its normal right-hand extremity and that no information is entered into the machine. For this purpose the motor bar or the "T" bar may be actuated, in which event an asterisk is recorded on the paper tape 12. First assuming that a numerical key (0—9) is depressed to enter a decimal digit into the machine and to generate the corresponding electrical signal, the operation of one of the numerical keys is such that with the depression of the key a short distance the magnet 20 mounted in the key will be placed in a position to cause the associated reed switch to close. With the continued travel of the numerical key to its lower extremity the pin carriage 21 is committed to a movement towards the left end, a slight left carriage motion is realized. With the continuing depression or movement of the operated numerical key to the extreme bottom position, the key will bottom out and upon its upward travel the carriage 22 will shift or index towards the left. This carriage motion places the apertures $23^a$ of the indexing indicator 23 in alignment with the light from the light source 24 to illuminate the photocell 25 and provide the desired timing signal associated with the operation of the numerical key. With the continued travel of the carriage to the left it will be indexed to the next position indicative of the entry of the numerical information into the machine at which time the indicator 23 will again restore the photocell 25 to its dark condition. As the key approaches its upward extremity or normal position, the associated reed switch 21 opens and the numerical key travel is stopped. Accordingly, it should be evident that at this time with the initial depression of a numerical key an electrical signal is generated from the reed switch 21 and is maintained during the key travel until shortly before the numerical key is restored to its normal position. During the indexing of the carriage 22, after the key bottoms out or is released the index 23 causes the photocell 25 to be illuminated for generating the desired timing signal.

The motor bar keys are arranged for generating the data signals in the same fashion as the numerical keys and generate the data signal from an associated magnet-operated reed switch 21. After these keys are slightly depressed, the data signal is generated and the associated reed switch 21 is maintained in a closed circuit condition until shortly before the motor bar key reaches its normally inoperative position. The motor bar keys as mentioned hereinabove are locked into a depressed position for a preselected interval in the conventional operation of the machine so that it will be maintained depressed even though the key is released. After the machine cycle key operates its associated reed switch and it continues to travel towards its bottom position, the motor in the machine is energized and starts the machine cycle operation. When the key reaches its bottom extremity the machine cycle switch 31 is closed. The machine then goes through and completes the machine cycle and restores the switch 31 to its normally open circuit condition and the associated reed switch 21 to its normally open condition. At this time it should be appreciated that in the event that an error is signalled from the associated electronic system that the subsequent depression of a motor bar key will prevent the machine from going through another machine cycle since at this time the lockout solenoid 40 is energized and prevents the motor lockout bar 41 from going through its lower excursion. To correct this error, for example, assuming that it is a keying error, the clear key is moved to its extremity at which time the switch 33 is operated and provides an electronic signal to the associated system indicating this condition.

What I claim is:

1. An input device comprising an adding machine having a plurality of manually operated data keys for mechanically entering data into the machine in a conventional fashion and a machine element movably responsive to the release of an actuated key, sensing means associated with each data key for generating an electrical data signal in response to the operation of each data key, and timing signal means coupled to be controlled by the movement of the machine element in response to the release of an operated data key for producing an electrical timing signal for each electrical data signal generated.

2. An input device as defined in claim 1 wherein the data keys comprise numerical keys and machine function keys and including photoelectric means for generating the timing signals in response to the release of the operated numerical keys and electromechanical switch means for generating the timing signals in response to the operation of the machine function keys.

3. An input device as defined in claim 1 wherein the sensing means comprises a magnetically responsive switch means individual to each data key for generating an electrical data signal in response to the presence of a magnetic field and said keys include magnetic flux generating elements carried by each key and mounted adjacent the individual switch means for switchably operating same in response to the operation of a key placing the magnetic flux into switch operating relationship with the switch means and returning the switch means to its nonoperated condition upon the return of the operated key to its nonoperated position.

4. An input device as defined in claim 3 wherein the magnetically operated switch means comprises reed switches and the flux-generating elements are permanent magnets mounted in one side of the data keys.

5. An input device as defined in claim 1 including means for locking up the adding machine.

6. An input device comprising a conventional 10-key calculating machine having printing means for printing out the information entered into the machine by means of the keys, each of the data keys of the machine being adapted for entering a different piece of data in the machine and producing an electrical signal representative thereof, each of the data keys mounting a permanent magnet therein to be movable with the key movement, a plurality of magnetically operable switches, one for each data key, mounted on the machine adjacent each data key to be responsive to the presence of the permanent magnet upon the operation of the data key and thereby providing an electrical output signal corresponding to the operated data key, said machine having an indexable machine carriage including a carriage index indicator having a plurality of spaced apart apertures thereon movable in response to the release of an operated data key, a light source mounted on one side of the carriage index indicator, and a light sensor mounted on the opposite side of the index indicator, the machine carriage, the light source and light sensor being arranged whereby the index indicator is positioned between the light source and light sensor to normally maintain the latter dark and to be illuminated through an index aperture upon the release of an operated key to provide a timing signal for the corresponding electrical data signal.

7. An input device comprising a conventional 10-key calculating machine having means for printing out the numerical data entered into the machine, said machine having ten numerical data keys, a plurality of calculating machine function keys and a "clear" key for operating the machine in a conventional fashion, said machine having a carriage movable in response to the operation of each data key for entering the number of the operated key in the machine and movable in response to the release of the operated key, said carriage carrying an apertured indexing element, each of the aforementioned keys mounting magnetic means movable with the keys, magnetic responsive switching means mounted adjacent each key to be switchably responsive to the placement of the magnetic means adjacent thereto for producing an electrical signal in response to the key operation, a light source mounted on the machine on one side of the indexing element, a light sensor mounted on the machine on the opposite side of the indexing element from the light source and normally arranged to be dark and to be illuminated through the indexing element aperture upon carriage movement for providing a timing signal for the generated numerical signals, first switching means mounted on the machine and coupled to the machine element to be switchably responsive to the operation of a machine function key for providing a timing signal for the signals of the machine function keys, and second switching means mounted on the machine to be switchable responsive to the operation of the "clear" key for providing a timing signal for the "clear" signal generated.

8. An input device as defined in claim 7 wherein magnetic means are magnets mounted on one side of each of the keys, and the magnetic responsive means are reed switches mounted adjacent an individual key to be operated upon operation of the individual key and the first and second switching means are electromechanical switches.

9. An input device as defined in claim 8 including means for signalling detected errors at the input device.

10. An input device as defined in claim 9 wherein the signalling means is a visual signal.

11. An input device as defined in claim 8 including means for locking up the adding machine.

12. An input device as defined in claim 1 wherein the data signals and the timing signals are generated and appear in independent circuits.